E. H. Angamar.
Dam.
No. 270. A. I. Patented Mar. 6, 1860.
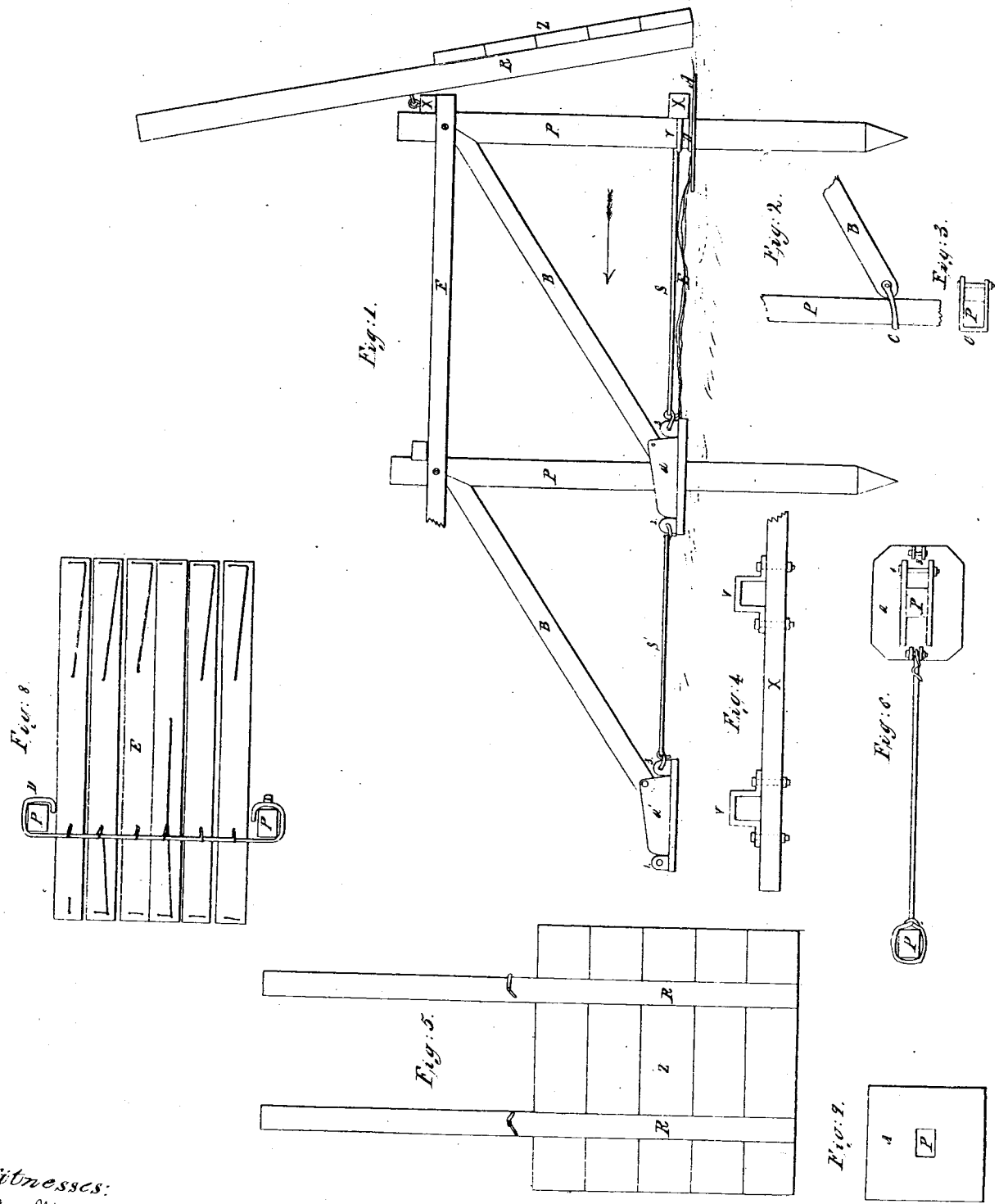
Witnesses:
William H Daniels
Grenville Lewis
Inventor
E. H. Angamar
Chas. F. Stansbury
Atty.

DEPARTMENT OF COMMERCE
UNITED STATES PATENT AND TRADEMARK OFFICE

---

MISSING PAGE(S)

PATENT NUMBER AI 270 FOR THE ISSUE DATE 03/06/1860 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims